United States Patent [19]

Curtis

[11] Patent Number: 5,406,267
[45] Date of Patent: Apr. 11, 1995

[54] METHOD AND APPARATUS FOR THE MONITORING OF THE OPERATION OF LINEAR AND ROTARY ENCODERS

[76] Inventor: Stephen J. Curtis, 213 Harris Rd., Nashua, N.H. 03062

[21] Appl. No.: 994,677

[22] Filed: Dec. 22, 1992

Related U.S. Application Data

[63] Continuation-in-part of Ser. No. 734,244, Jul. 22, 1991, Pat. No. 5,302,944.

[51] Int. Cl.$^6$ ............................................. G08B 21/00
[52] U.S. Cl. ................................... 340/653; 340/657; 340/658; 250/205
[58] Field of Search ............... 340/653, 657, 630, 660, 340/661, 662, 663, 658; 250/205, 231.14, 231.16, 237 G; 346/108; 364/551.01

[56] References Cited

U.S. PATENT DOCUMENTS

| | | | |
|---|---|---|---|
| 4,206,456 | 6/1980 | Malinowski et al. | 340/630 |
| 4,581,617 | 5/1986 | Yoshimoto et al. | 346/108 |
| 4,620,094 | 10/1986 | Tani et al. | 250/205 X |
| 4,901,255 | 2/1990 | Lynn et al. | 364/551.01 |
| 5,051,579 | 9/1991 | Tsukiji et al. | 250/231.16 |
| 5,302,944 | 4/1994 | Curtis | 340/653 |

*Primary Examiner*—Jeffery A. Hofsass
*Attorney, Agent, or Firm*—Robert K. Tendler

[57] ABSTRACT

A system is disclosed for monitoring the operation of an encoder having a scale which is illuminated from a light source, in which light from the scale is detected by a detector, with the encoder having means coupled to the detector for detecting in-phase and quadrature signals representing scale position, means for detecting the phase difference between the in-phase and quadrature signals, and means responsive to the detected phase difference for adjusting the output of the light source to maintain its output at a predetermined level and for providing an error signal representing the amount of adjustment of the output of the light source.

4 Claims, 9 Drawing Sheets

METHOD AND APPARATUS FOR THE MONITORING OF THE OPERATION OF LINEAR AND ROTARY ENCODERS

RELATED APPLICATIONS

This application is a continuation-in-part of patent application Ser. No. 07/734,244, filed Jul. 22, 1991, now U.S. Pat. No. 5,302,944.

FIELD OF THE INVENTION

This invention relates to rotary or linear encoders and more particularly to a scale guarding system in which the efficiency of the encoder is monitored, with suitable alarms being initiated for a malfunctioning encoder, or one whose time history of operation indicates imminent failure.

BACKGROUND OF THE INVENTION

As is common, rotary and linear encoders have been utilized to measure shaft rotation or linear movement through the interposition of a scale provided with opaque and transparent regions lying next to each other in a regular pattern. When the scale is passed between a light source and a detector, the output of the detector is a series of pulses or sine waves which are detected to derive either the position of the scale or angular position of a rotary shaft.

Two of the major causes of failure for such encoders is the problem of dirt or other contaminants in the light path between the light source and the detector and/or aging of the illumination source. Typically, encoder scales become so dirty in the environment in which they are employed, that the intensity of the beam from light source to detector is so reduced by a dirty scale that spurious readings result. The same failure mechanism is caused by gradual illumination aging.

This scale condition is not readily apparent until the operation of the encoder has so deteriorated that erroneous readings cause equipment malfunction. When encoders are utilized in a servo loop for instance for positioning a valve, the erratic reading may go undetected until such time as valve operation is so impaired that catastrophic results occur. It will be apparent that such a failure could be catastrophic when such a servo system is used to control fuel to a rocket engine, or when such a valve is utilized to control a chemical process. In fact, weak signals from encoders are responsible for unexplained erratic behavior sometimes attributed to other causes within the servo system.

It is therefore necessary to provide an early warning system for the malfunctioning of rotary or linear encoders in which not only is catastrophic failure of the encoder indicated as an alarm condition, but also the deterioration of the encoder output over time is detected to indicate either a predictable mean time to failure for the encoder, or to permit encoder replacement or repair prior to outright failure.

As an additional problem, for reflectance type encoders in which the light source and the detector are on the same side of the scale and light is reflected from the source to the detector, movement of the scale away from the source/detector pair results in a decreased detector output due to a portion of the light being reflected away from the detector's position. As a result, these encoders have a varying amplitude output which is difficult to process by downstream equipment.

Moreover, an aging light source can in fact simulate a dirty scale, such that the erratic readings from the encoder may be attributed to the wrong source, usually contamination.

It is therefore necessary to provide a system which if it cannot distinguish between tdim light sources or the dirty encoder scale condition, at least provides a warning and a histogram from which the cause of the encoder output degradation can be ascertained.

SUMMARY OF THE INVENTION a) Analog Encoders

In order to provide a scale guarding technique and system, in analog encoder systems a method and apparatus is provided for sensing the maximum amplitude of the light coming from the scale and for ascertaining malfunction or potential malfunction through the error voltage utilized to maintain a constant maximum detector output. This is accomplished by varying the voltage to the light source. It will be appreciated that the error signal utilized is an excellent indicator of the status of the encoder output signal since, in one embodiment, the output voltage from the detector is compared to a reference standard and the voltage to the light source raised upwardly for the detector voltage going below a preset reference voltage, whereas the light source voltage is decreased for detector outputs which exceed this reference voltage. The error signal, e, can be utilized in and of itself to indicate a malfunction of the encoder since if this error signal rises above a predetermined threshold it signifies that the amplitude of the detected light is degraded below some predetermined design specification level. Should the error signal increase drastically over a short time, this is an indication of potentially complete occlusion of the light path between the light source and the detector, either indicating complete scale degradation due to dirt and other contaminants, or a faulty light source. In either event, this is sensed as alarm condition to indicate outright failure.

Future failure is indicated, in one embodiment, by generating a histogram of the error signal over time so as to be able to track or predict mean time to failure of the encoder, absent a catastrophic failure such as light source burnout, or complete occlusion of the scale by some catastrophic event. In order to measure this, $\Delta e/\Delta T$ may be utilized as a quantity for measuring the time varying rate of deterioration such that when this rate exceeds a predetermined threshold, a second alarm indication may be actuated.

In one embodiment, the control loop includes an up/down counter coupled to the output of a comparator, with a count up resulting in increased light source voltage; and with a count down reducing the voltage. The number associated with the increment or decrement during a given period of time is defined as the error signal, e, with standard digital processing being able to provide alarm condition calculations based on the increment or decrement of the number in the counter.

In summary, a system is provided for monitoring signals from a linear or rotary encoder or scale to provide a warning of a malfunction of the encoder or to be able to predict a future malfunction. The system includes a feedback circuit for comparing the output of the detector in the encoder with a voltage reference and for either raising or lowering the voltage to the light source for maintaining constant maximum light transmission or reflectance respectively through the transparent portions of the scale or from reflective surfaces of the scale; thus regardless of dirt build-upor the condition of the light source on the scale. Here the amount of voltage correction to the light source is an indicator of the level of functioning of the encoder.

In one embodiment, an absolute voltage reference check is provided such that when the error signal used to control the light source voltage exceeds a predetermined threshold, a failure alarm indicator is actuated.

Additionally, in one embodiment, a histogram is provided in which the error signal is graphed over time, with the histogram indicating the condition of the encoder by documenting any decline in operation. In this latter case, a warning as to future malfunction is determined by the rate of change of the error signal, $\Delta e/\Delta T$, increasing above a predetermined threshold. The system, as a by-product, additionally provides a constant maximum amplitude output signal for the encoder to simplify downstream processing, a feature uniquely applicable to reflecting scales such as ruled steel, which suffer not only from contamination, but also due to variation in the distance between the surface of the scale and both the light source and detector which are on the same side as the scale.

In a preferred embodiment, the output from the encoder's detector is coupled to a comparator, the output of which is utilized to drive an up/down counter which is incremented for signals below a reference threshold and which is decremented for signals above this reference threshold. Since rotary encoders or linear encoders usually provide quadrature output signals which are 90 degrees out of phase, positive going zero crossovers are utilized to provide clock pulses for the sampling of the other of the quadrature signals, with the sampling to occur at or about top dead center of the sampled waveform. This provides for a sampled voltage corresponding to the maximum voltage obtainable from the output of the detector.

Additionally, this system provides for measurement only when the encoder scale is moving, with the direction of movement being ascertainable from the system. In order to accomplish this, system clock pulses used for sampling are only generated when the scale is moving. Thus measurements are only taken on a moving scale to provide system stability.

b) Digital Encoders

While the above relates to analog encoders which produce sine wave outputs in quadrature, a new class of encoders provide in-phase and quadrature pulsed outputs, with the signal conditioning taking place in so-called TTL (transistor transistor logic) circuits within the encoder itself. Note, the technique of determining a dirty scale condition associated with analog encoders by measuring light throughput is not well adapted to digital encoders.

Rather, in the digital encoder case it has been found that dirty encoder scales are indicated not by output signal amplitude, but rather by the phase difference between the in-phase and quadrature signals.

Malfunctioning of digital encoders in the past has been addressed in U.S. Pat. No. 4,901,255 in which the timing of phase changes is determined so that as the encoder scale gets dirty, the phase change over time is measured and compared to the time allocated to a mean phase change. In short, this patent measures encoder condition by measuring the time rate of change of phase, rather than measuring absolute phase difference. This is an unduly complicated system and one which does not necessarily reflect a deterioration in the encoder because the phase changing time interval may be too slow to be adequately detected.

It has, however, been found that a more accurate and rapid indication of encoder condition is through the measurement of the phase difference between the in-phase and quadrature signals from the encoder.

For a perfectly clean encoder scale, the phase difference between the in-phase and quadrature signals is 90°. However, it has been found that for dirty scales the phase difference varies to either side of the 90° clean-scale phase relationship. In one embodiment when this phase difference exceeds 90°±20°, sufficient dirt has accumulated on the scale to indicate imminent failure of the encoder.

In the digital embodiment, the phase difference is measured by measuring the time difference between the leading edges of the in-phase and quadrature pulses; and a pulse having a width proportional to the phase difference is generated. The energy in this pulse is integrated by an RC filter to produce an analog signal having a voltage proportional to the phase difference. How dirty the scale is is ascertained by comparing the absolute value of the analog signal to a reference voltage corresponding to an exact 90° phase difference. Thresholding circuits are used to detect a 20° phase error and to provide an appropriate alarm, in one embodiment in the form of a lamp which is turned on.

The time history of the analog voltage can also be used to provide a histogram so that the operation of the encoder can be monitored over time.

In addition to providing an alarm signal or indication, the analog phase difference voltage can be utilized to increase the voltage to the encoder's light source so that as the encoder becomes dirtier, the light source intensity is increased. In one embodiment this is accomplished through the use of UP-DOWN counters which count up when the absolute value of the analog voltage is above that associated with a 20° phase error. When the light source intensity is increased, the phase error between the in-phase and quadrature signals decreases, resulting in a count-down sequence, such that the scale monitoring system for the digital encoder operates in the same manner as the analog encoder scale monitoring system.

In one embodiment, a divide-by-256 circuit is provided to space out the phase samplings to prevent errors due to slow moving scales. For slow moving scales a timeout circuit inhibits the UP-DOWN counters. The reason for ignoring slow moving scales is that phase difference readings from such scales are unreliable due to the RC integration filter which will charge up to maximum voltage between pulses, when the in-phase and quadrature pulses are far apart. It will be appreciated that in this case the integrated voltage level does not reflect phase difference.

BRIEF DESCRIPTION OF THE DRAWINGS

These and other features of the subject invention will be better understood in conjunction with the Detailed Description taken in conjunction with the Drawings of which.

DETAILED DESCRIPTION

Figure 1A:
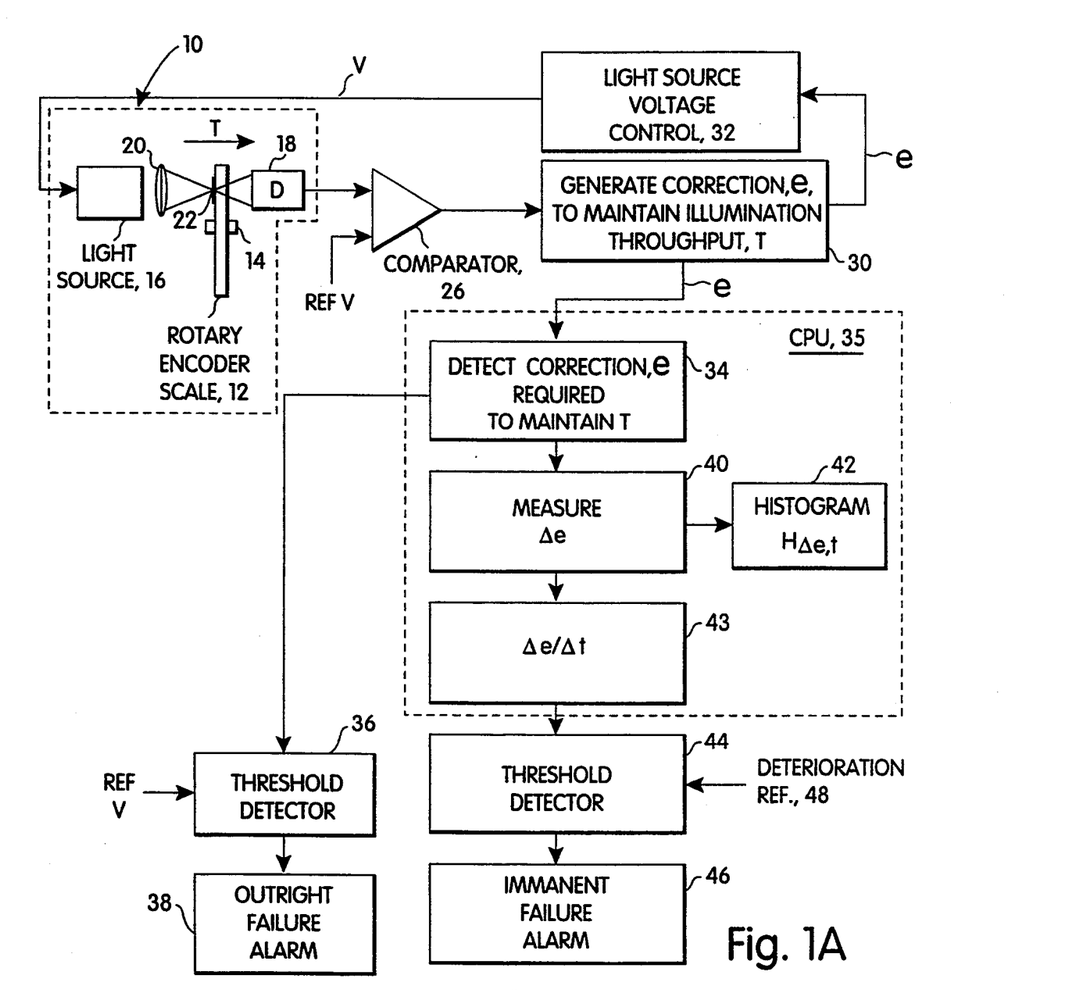
FIG. 1A is a block diagram illustrating the subject system for light source voltage control and the generation of an error signal which is utilized to detect both imminent scale failure and outright failure.

Referring now to FIG. 1A, encoder 10, here a rotary encoder, is provided with a rotary encoder scale 12 which rotates about a shaft 14 and is positioned between a light source 16 and a detector 18, with the light from light source being focused by a lens 20 onto a marking 22 on the scale. The output of detector 18 is coupled to a comparator 26 to which is applied a reference voltage, in one embodiment 5 volts. The output of comparator 26 is coupled to a unit 30, the function of which is to generate a correction signal, e, which is utilized to maintain the illumination throughput, T, such that the maximum illumination throughput is constant. In order to do this, the signal generated by unit 30 is applied to a voltage control unit 32 which supplies a voltage, V, to light source 16 in a closed loop arrangement.

The error signal, e, is applied from unit 30 to a unit 34, optionally in a CPU 35, which detects the correction signal, e. This signal is converted to a signal having a magnitude corresponding to the absolute value of the error signal; and is applied to a threshold detector 36, with its other input being a reference voltage, $V_{REF}$. The output of threshold detector 36 is a signal which is coupled to Outright Failure Indicator 38 upon detection of an error signal increasing beyond the threshold limit. This indicates outright failure of the encoder, presumably due to either a completely occluded encoder scale or failure of a light source.

Before outright failure, imminent (eg. future) failure is detected by measuring $\Delta e/\Delta t$ by a measuring unit 40 within CPU 35 which supplies the result to a histogram generating system generally indicated by reference character 42. The histogram is a graph of the error signal over time. It will be appreciated that upon viewing the histogram produced by this system, one can ascertain whether or not the output of the encoder is deteriorating or not to permit appropriate action to be taken.

Alternatively, $\Delta e/\Delta t$, can be calculated as illustrated at 43 within CPU 35, with a signal representing the magnitude of this ratio being supplied to a threshold detector 44, the output of which is applied to an Imminent Failure Alarm unit or indicator unit 46, with threshold detector having been supplied with a deterioration reference level as indicated at 48.

In this manner an encoder's operation can be monitored both for outright failure and imminent future failure.

Figure 1B:
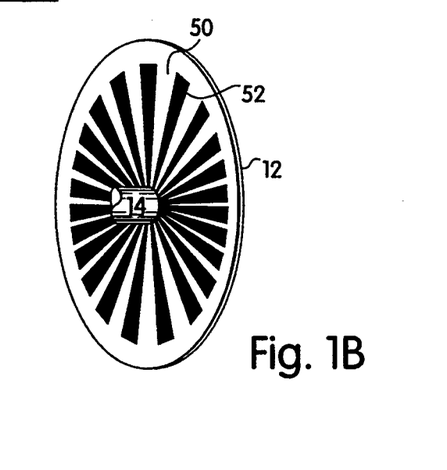
FIG. 1B is a diagrammatic illustration of a rotary encoder scale for use in the system of FIG. 1A.

Referring to FIG. 1B, a rotary encoder scale 12 is illustrated as having alternating light and dark areas respectively illustrated by reference characters 50 and 52 which determine the angular position of shaft 14 and are therefore useful in measuring its motion.

Figure 2A:
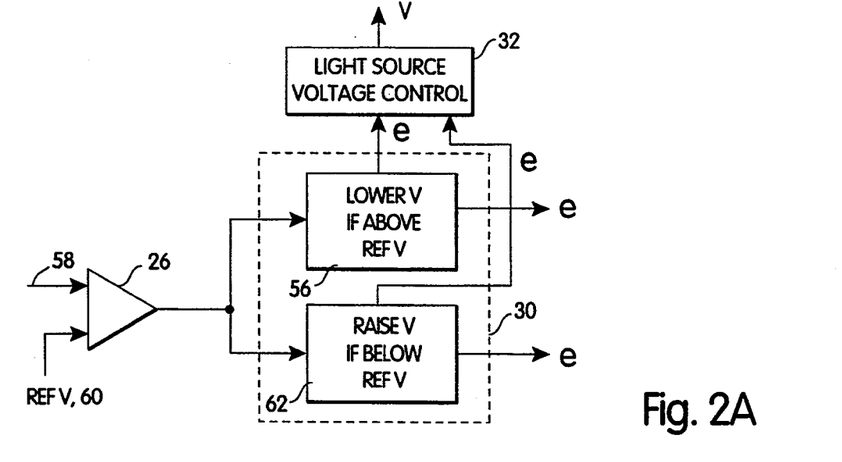
FIG. 2A is a block diagram illustrating the unit utilized to generate a correction voltage to maintain illumination throughput by the raising and lowering of the voltage to the light source.

Referring now to FIG. 2A, unit 30 which generates the correction signal is illustrated as including a unit 56 which produces a signal, e, having a magnitude which increases if the signal on input 58 of comparator 26 exceeds the reference voltage illustrated at 60. This signal then causes the light source voltage control unit 32 to decrease its voltage.

Likewise, if input signal 58 is below the reference voltage shown inputted at 60, then a unit 62 provides an error signal, e, which is applied to light source 32 to increase the voltage to the light source.

Figure 2B:
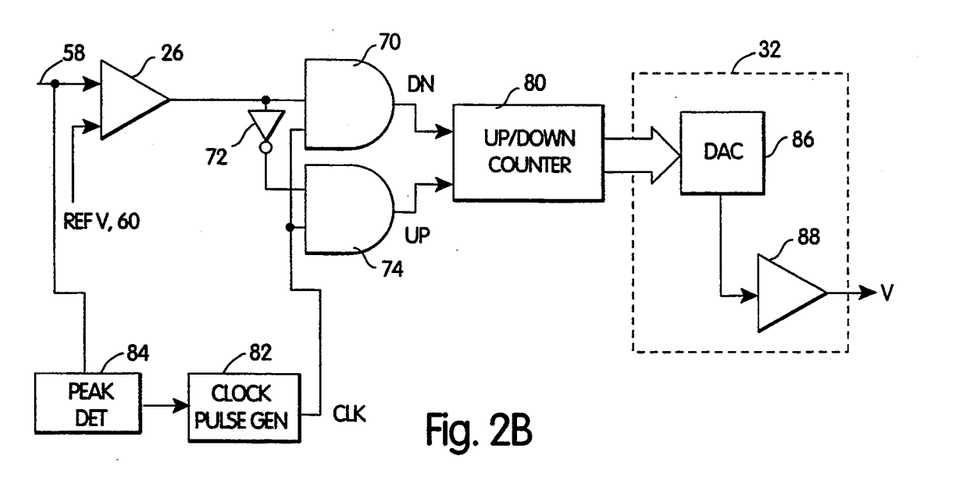
FIG. 2B is a block diagram illustrating one embodiment of the unit for generating the correction voltage through the utilization of zero cross over detection and the utilization of an up/down counter, the output of which is converted to an analog signal through a digital to analog converter and an amplifier within the light source voltage control unit of FIG. 1A.

How this is accomplished is illustrated in FIG. 2B. The output of comparator 26 is applied to one input to an AND gate 70 and through an inverter 72 to an input of AND gate 74 as illustrated. Clock pulses are provided to the other inputs of AND gates 70 and 74. AND gate 70 provides a pulse to up/down counter 80 to decrement this counter, whereas the output of AND gate 74 provides a pulse to counter 80 to increment this counter.

The clock pulses are provided via a clock pulse generator 82 which generates a clock pulse at each time there is an output of a peak detector 84 which is coupled thereto, and which samples the signal at input 58 to ascertain its peak. Therefore, the sampling and clocking is accomplished at the peak of the pulses from the encoder. This means that it is maximum illumination which is sensed in order to provide control for the light source and thus the generation of the aforementioned error signal.

As illustrated in FIG. 2B, the output of up/down counter 80 is provided to a digital to analog converter 86, the output of which is applied to a voltage amplifier 88. The output of amplifier 88 is utilized to provide power to the illuminating source for the encoder.

Figure 3:
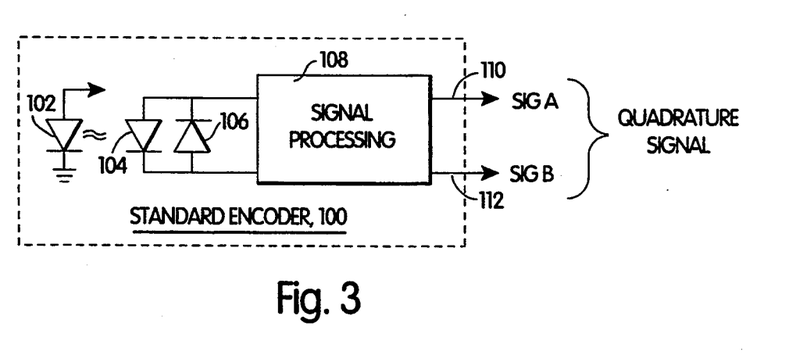
FIG. 3 is a block diagram illustrating a standard comparator and quadrature signals therefrom.

Referring now to FIG. 3, in order to be able to provide clock pulses which result in sampling of peak signals, it is important to understand that a standard decoder, here shown at 100, includes a light source in the form of an LED 102 and back-to-back diode detectors 104 and 106 coupled to a signal processing unit 108. The output of this unit is in the form of quadrature signals A and B, as illustrated at outputs 110 and 112 respectively.

Figure 4:
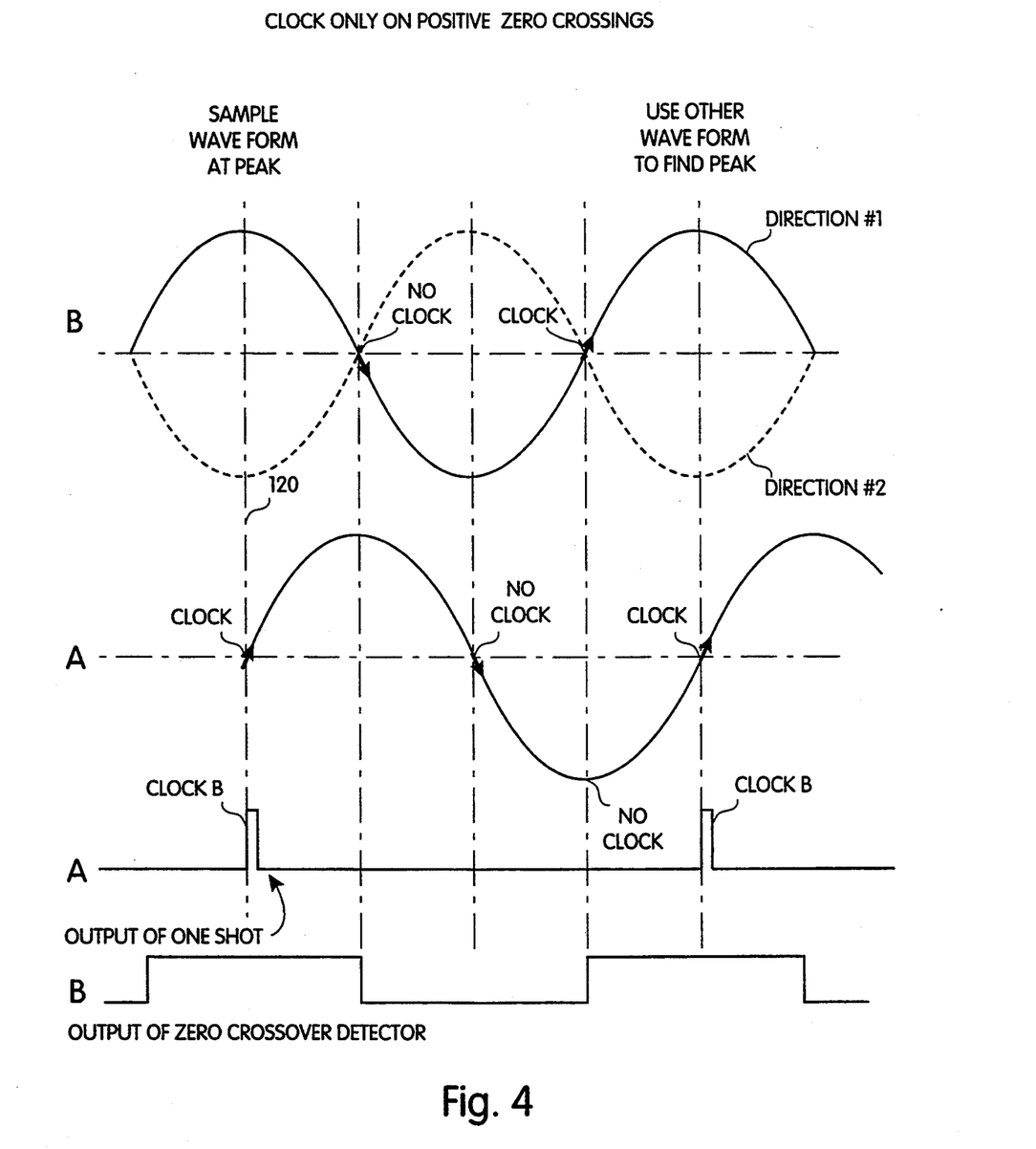
FIG. 4 is a waveform diagram illustrating the output signals from a standard encoder of FIG. 3, also illustrating the generation of clock pulses from one of the two quadrature signals so as to be able to sample the other of the two quadrature signals.

Referring now to FIG. 4, for a scale moving in a first direction, DIRECTION #1, it can be seen that it is possible to utilize one of the two quadrature signals to provide the clock pulses for sampling the other of the two quadrature signals at the peak thereof.

As can be seen from waveform A in this diagram, circuits can be arranged such that clock pulses are generated only on positive going excursions across a zero level as sensed by a zero crossover detector which will be described. The output of the zero crossover detector can be sharpened and applied as a clock pulse to measure or sample the other quadrature waveform at its peak as illustrated by a dotted line 120. Assuming that Signal A is applied to a zero crossover detector/one shot multivibrator combination to provide sampling pulses for Signal B; and assuming the duration of the output of another crossover detector coupled to Signal B is high indicating a positive Signal B peak, it can be seen that the output of an AND gate can be activated only at positive Signal B peaks. Thus, the B waveform is sampled only at its positive peak due to the 90 degree phase shift between the Signal A and B waveforms.

It will also be appreciated that in the scenario shown in FIG. 4, it is only Signal B which can be sampled. This is because the encoder scale is going in DIRECTION #1. For movement in an opposite direction, DIRECTION #2, Signal A can be sampled by providing a duplicate set of electronics such that it is the A waveform which is sampled, with the B waveform providing the clocking pulses. For DIRECTION #2 movement, waveform B is inverted 180 degree and is 270 degrees out of phase with waveform A. This is shown by the dotted B waveform. In this manner either direction of the encoder scale can be accommodated.

Figure 5:
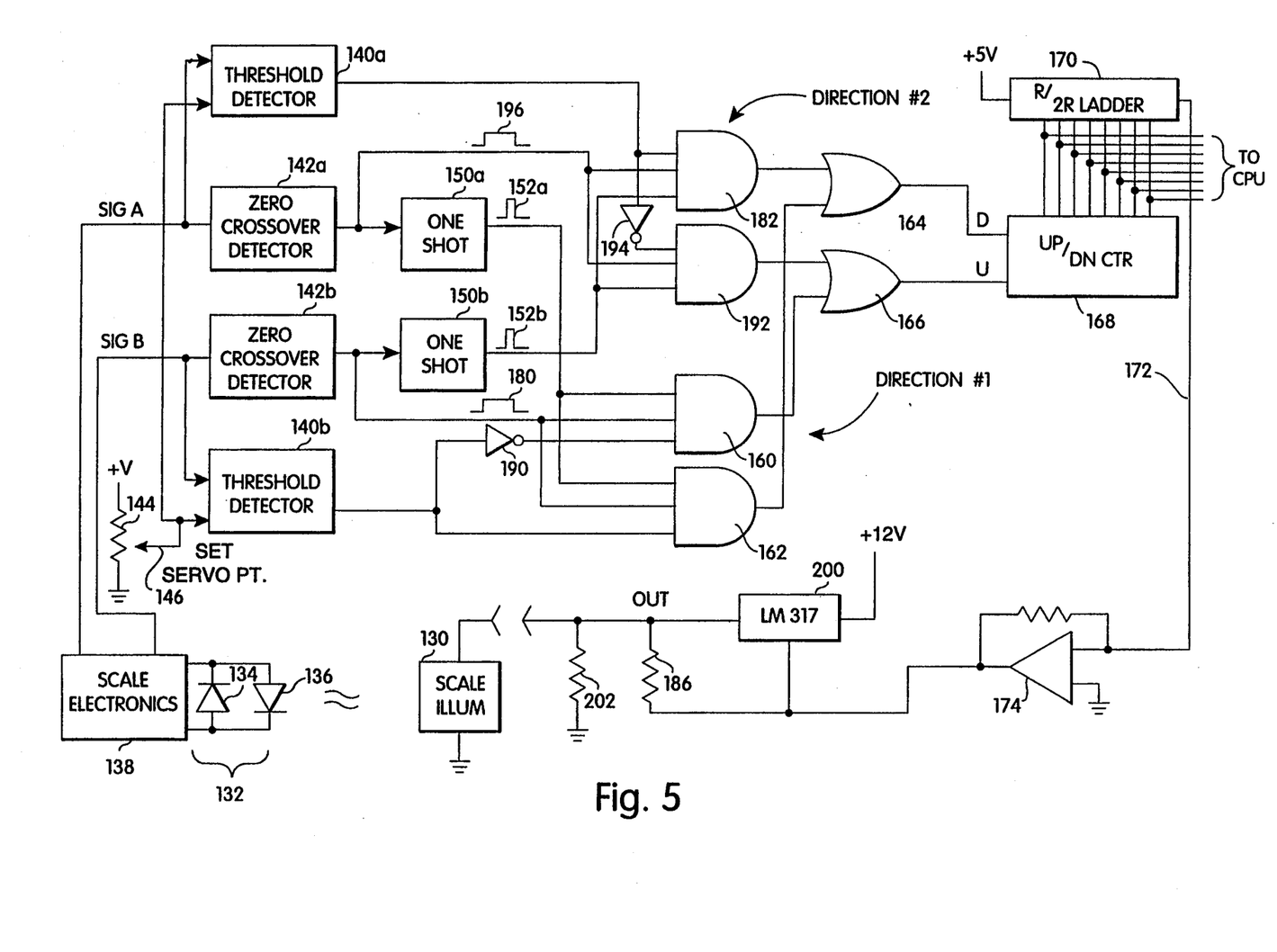
FIG. 5 is a detailed block diagram of one embodiment of the subject invention illustrating the utilization of quadrature signals in the control of scale illumination.

Referring now to FIG. 5, in one embodiment the system of FIG. 1A can be implemented through the utilization of pairs of threshold detectors, zero crossover detectors, and one shot multivibrators. In this figure, the encoder includes a scale illumination 130 and a detector here illustrated at 132 to include back-to-back photo diodes 134 and 136 which are coupled to scale electronics 138 adapted to provide the aforementioned quadrature signals, Signal A and Signal B.

Each of these quadrature signals is supplied to its respective threshold detector 140a and 140b and also simultaneously to zero crossover detectors, respectively 142a and 142b. It will also be appreciated that threshold detectors 140a and 140b are provided with a variable reference voltage supply by a resistor 144 between V+ and ground, in which the voltage reference can be varied via tap 146.

The outputs of respective zero crossover detectors 142a and 142b are provided to corresponding one shot multivibrators 150a and 150b that provide short squared up clocking pulses 152a and 152b for each positive going zero crossing of the input signal.

The output of one shot multivibrator 150a is applied to the input terminals to AND gates 160 and 162, the outputs of which are applied respectively to OR gates 164 and 166. The outputs of these OR gates drive an up/down counter 168, with each output line representing a digit driving an R2R ladder network 170 for the generation of a corresponding analog error voltage applied by line 172 to an amplifier 174 which is utilized to drive scale illuminator 130 with the appropriate voltage, through the use of current amplifier 200.

In operation, for scale movement in DIRECTION #1, a positive going Signal B produces an elongated positive pulse 180 to establish when Signal B is positive. This elongated positive pulse is applied to one of the inputs to AND gate 162. The other input to AND gate 162 is provided with the short clock pulse 152a from one shot multivibrator 150a such that the output of threshold detector 140b is sampled upon a crossover of Signal A during which time Signal B has been verified as being positive via the output of zero crossover detector 140b. The B signal, should it be above the threshold detector level set by threshold detector 140b, causes an output from AND gate 162 to be applied to one input of OR gate 164, which decrements up/down counter 168. This is appropriate since the Signal B level is above the chosen threshold. Upon decrementing up/down counter 168, the resulting decreased number is sensed by R2R ladder 170, with a signal resulting from the combined count of counter 168 being utilized to drive down the output from amplifier 174 such that its output reduces the illumination available from scale illuminator 130.

It will be appreciated that threshold detector 140b has an output applied to inverter 190, the output which is applied to one of the inputs to AND gate 160, which also has applied to it a Signal A sampling pulse and a Signal B positive going assurance pulse. If the Signal B amplitude is lower than the threshold that detector 140b is set at, the output of threshold detector 140b goes low. Because the output of threshold detector 140b is inverted, there will be an output from AND gate 160 to OR gate 166, which results in incrementing counter 168. Note, for DIRECTION #1, neither AND gate 182 or AND gate 192 has an output and so has no affect on the system as long as the scale moves in this direction.

In the case illustrated, it is the Signal A waveform which results in the sampling pulses to sample Signal B. For a reverse direction, it would be the Signal B signal which provides sampling pulses for sampling Signal A. This is accomplished through the action of zero crossover detector 142b and one shot multivibrator 150b to provide the clock pulse; through zero crossover detector 142a to assure a positive Signal A peak; and through threshold detector 140a to determine the Signal A level.

Thus, the FIG. 5 circuit will operate regardless of the direction of motion of the scale.

Note that the output of amplifier 174 is applied to current amplifier 200 to increase the light source drive current.

The following text is an algorithm for predicting failures of a scale using the scale guard system. The only undefined operations are get_limit( ), and get_sample( ). The results of the get_limit( ) operation is a voltage level corresponding to the point of scale failure. This algorithm predicts when the encoder will need that level of voltage. The result of the get sample( ) operation is the voltage signal currently being applied to the scale.

```
limit = get_limit ()
first_sample = get_sample ()
for every hour
    sample = get_sample ()
    current_slope = (sample - first_sample) / hours
    if current_slope 0 then
        hours_until_failure = (limit - sample) / current_slope;
    endif
end for
```

Hours is the number of hours that have passed since the first sample was taken. The equations were generated from the standard line equations. The first sample is combined with the current sample and is used to generate a line, where the X axis is hours, and the Y axis is voltage. The slope of this line is found, and is used to determine where that line would cross the voltage limit. Hours is arbitrary, any unit of time could be used.

```
/   This software was written to test implementation of the
    scaleguard's ability to predict future failures based on the
    current rate of change in the error signal.
/
#include <stdlib.h>
#include <oath.h>
#include <stdio.h>
#define TRUE -1
#define FALSE 0
main ( )
{
    double yellow__limit,red__limit;
    double first__sample,sample;
    double current__slope, hours__until__failure;
    int hours;
    printf("Enter yellow limit of scale voltage >");
    scanf("%1f",&yellow__limit);
    printf("Enter red limit of scale voltage >");
    scanf("%1f",&red__limit);
    hours = 0;
    printf("Please enter the first sample >");
    scanf("%1f",&first__sample);
    while(TRUE) {
        hours = hours + 1;
        printf("Hour number %d \ n",hours);
        printf("Enter new sample >");
        scanf("%1f",&sample);
        current__slope = (sample - first sample) / hours;
        if(current__slope < = 0.0) {
            printf("The scale will never fail! \ n");
        } else {
            hours__until__failure = (yellow__limit - sample) /
            current__slope;
            if(hours__until__failure < = 0.0)
                printf("The yellow light is lit \ n");
            else
                printf("The yellow light will light in %1f hours. \ n",
                hours__until__failure);
            hours__until__failure = (red__limit - sample) /
            current__slope;
            if(hours__until__failure < = 0.0)
                printf("The red light is lit n");
            else
                printf("The red light will light in %1f hours. \ n",
                hours__until__failure);
```

Figure 6:
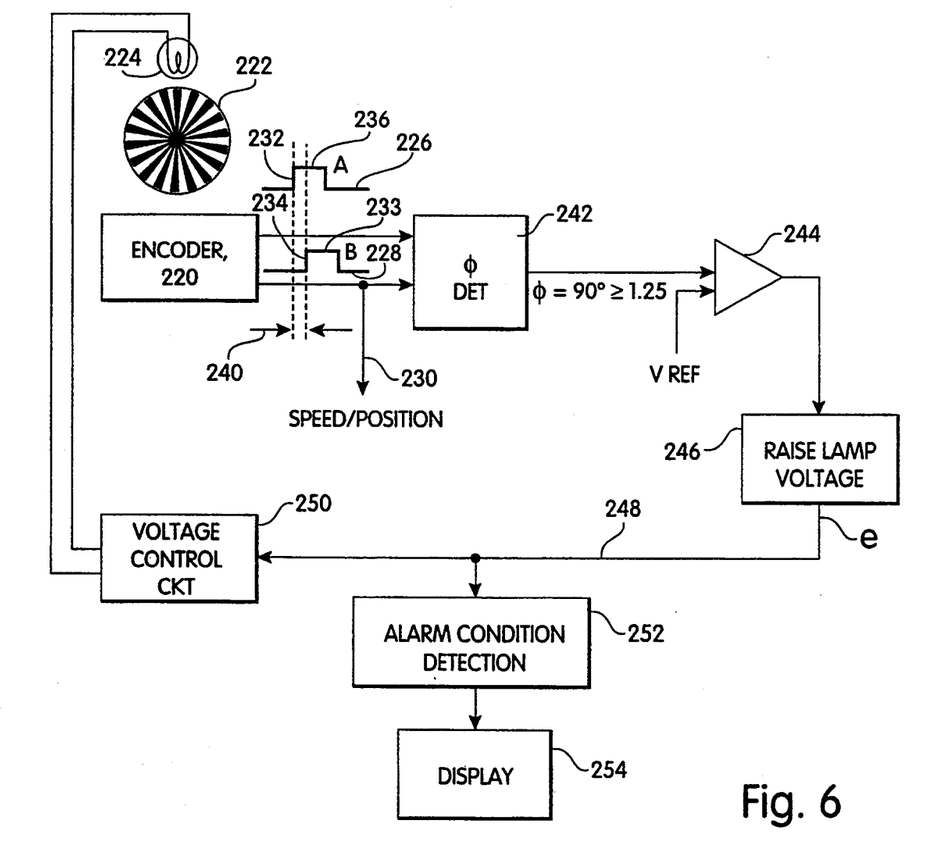
FIG. 6 is a block diagram of another embodiment of the subject invention for digital encoders showing encoder condition as a function of phase difference between in phase and quadrature signals.

Referring now to FIG. 6 in an alternative embodiment, the scale monitoring system can be adapted to be utilized with a digital encoder, here illustrated by reference character 220, coupled to a scale 222 illuminated by a light source 224, with the output of the encoder being an in-phase pulsed signal 226, and a quadrature pulsed signal 228. These two pulsed signals can be utilized to develop a speed or position indication as illustrated by arrow 230. However, both in-phase and quadrature signals are used in determining the direction of rotation or movement of the scale.

In order to obtain a measurement of the efficiency of the encoder so as to be able to predict imminent or future failure, the leading edges 232 and 234 of respective pulses 236 and 238 are measured, with the time difference between the leading edges of the pulses being an indication of the phase difference between the two output signals.

Under normal circumstances, the phase difference as indicated by arrows is 90°, assuming a new clean scale. However, when the scale becomes dirty or aged the phase difference between these leading edges sometimes exceeds 20° in either direction. What this means is that the dirty or worn scale condition is indicated by a phase difference of 90° plus or minus for instance 20°.

In order to obtain the phase difference between these two signals a phase detector 242 measures the phase difference and provides an output voltage which is proportional to the phase difference. The output of the phase detector is applied to one input of a comparator 244, having as its other input a signal, $V_{REF}$, with $V_{REF}$ set in one embodiment to 1.25 volts, that being the voltage level associated with an exact 90° phase difference.

The output of the comparator is applied to a unit 246 which senses when the absolute value of the voltage is outside of set parameters and provides a signal on line 248 to a voltage control circuit 250 which raises the current to light source 224, in an effort to compensate for the scale becoming dirty or aging.

It will be appreciated that the digital embodiment of the subject system is substantially identical to the analog embodiment. Namely, while in the analog case the correction voltage depends upon the analog output of the detector in the encoder, in the digital case this analog voltage is derived from a phase difference detector, with both analog voltages measuring the same thing, namely, the dirtiness or condition of the scale.

Thus, in the digital embodiment where phase difference is measured, the result is nonetheless maintaining the light throughput between the light source and the detector at a predetermined maximum level. The feedback circuitry which controls the light source voltage or current adjusts the light source output to maintain this maximum light throughput which, in essence, is set by the reference voltage to the comparator.

In the digital embodiment with a decreased light throughput indicated by a change in phase difference, a counter is incremented to increase light source voltage or current and thus light source output. When the light source output is such as to drive the phase difference to 90°, the counter is decremented to reduce the light source voltage or current.

The light source output is therefore controlled by the reference voltage to the comparator, whether it is comparator 26 of FIG. 1A or comparator 224 of FIG. 6.

This being the case, not only is the light source output controlled identically to that described in connection with the analog embodiment, the error correction signal e used to measure the condition of the encoder is identical.

Referring again to FIG. 6, as illustrated, a alarm condition detection circuit 252 senses the signal on line 248 to provide an alarm condition signal commensurate with the dirtiness or condition of the scale. This is applied to a display 254 which may be in the form of an audible alarm, a light array, or any kind of graphical display, including histograms.

Figure 7:
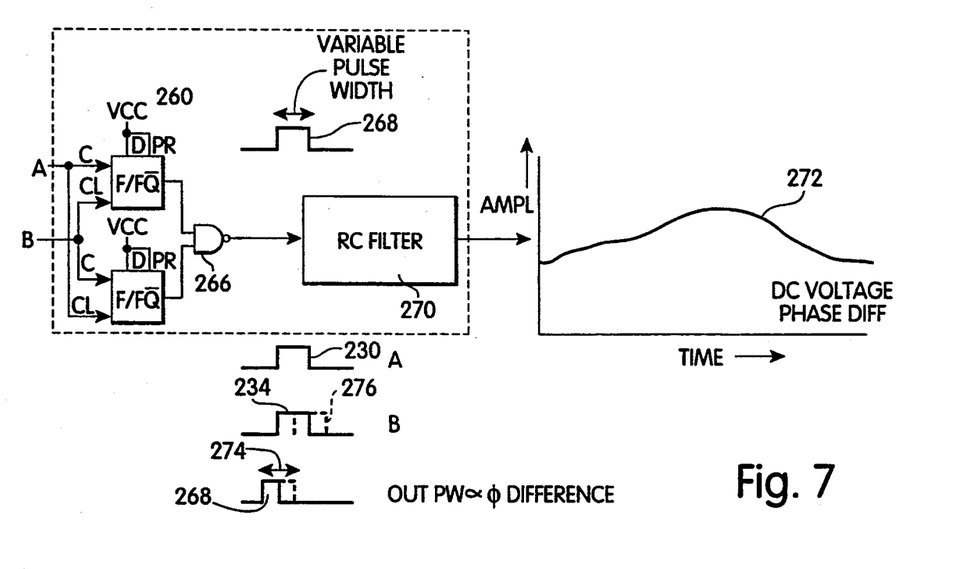
FIG. 7 is a block diagram of the phase detection portion of this circuit of FIG. 6.

Referring now to FIG. 7, phase detector 242 includes in one embodiment two flip-flops, namely flip-flops 260 and 262, with the in-phase signal, signal A, being applied to the clock terminal of flip-flop 260 and to the clear terminal of flip-flop of 262, whereas the quadrature signal, signal B, is applied to the clear terminal of flip-flop 260 and the clock terminal of flip-flop 262. The outputs of these flip-flops are applied to an and gate gate 266, the output of which is a variable width pulse 268. This pulse is applied to an RC filter 270 which provides as an output a voltage having an amplitude proportional to the length of the pulse, e.g., the amount of energy within the pulse. As illustrated at the right of this figure, a trace 272 of the voltage indicates a DC voltage which is proportional to phase difference.

Referring to the wave forms at the bottom of FIG. 7, as can be seen, the leading edge of pulse 230 is compared with the leading edge of pulse 234 to provide pulse 268, the length of which is variable as illustrated at 274. Pulse 268 is therefore a pulse having a pulse length equal to the time difference between the leading edges of the in-phase and quadrature signals from the encoder. When, due to a dirty or aged scale, the quadrature pulse shifts as illustrated by dotted outline 276, it will be apparent that length of pulse 268 from and gate 266 changes to reflect the changing phase difference.

Figure 8:
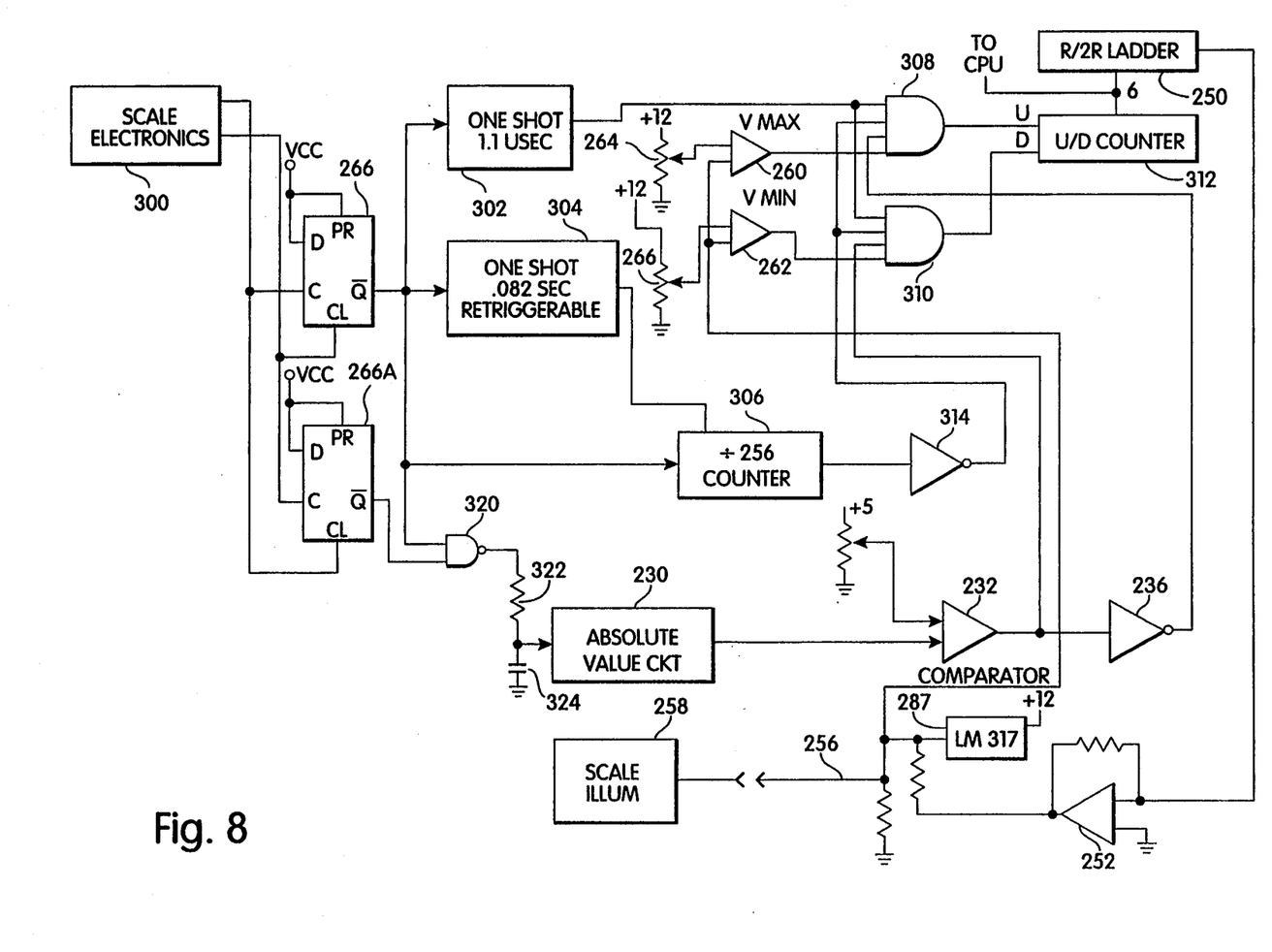
FIG. 8 is a detailed block diagram of one implementation of this FIG. 6 system; and, FIGS. 9A, B and C are detailed schematic diagrams of the system illustrated in FIG. 8.

In order to implement the above-identified scale monitoring system, and now referring to FIG. 8, scale electronics 300 of encoder 220 is coupled to latch 266, the output of which is applied to a one-shot multivibrator 302 which is set to time out, in one embodiment, at 1.1 microseconds. The output of latch 266 is also coupled to a one-shot retriggerable multivibrator 304 which is set to time out at 0.082 seconds for example. The output of this one-shot multivibrator is utilized to reset a divide-by-256 counter 306, to which the output of latch 266 is also applied. The purpose of one-shot multivibrator 302 is to provide a narrow pulse window for eliminating noise in the circuit, such that AND gates 308 and 310 utilized to provide up/down inputs to an up/down counter 312, are only enabled during this short period of time.

One-shot multivibrator 304 is utilized to provide for ignoring slow moving scales whose count does not reach 256 within a given time period, namely 0.082 seconds. The output of counter 306 is a negative going pulse which is inverted by inverter 314 and is applied to one of the inputs to AND gates 308 and 310. In operation, if after reset counter 306 is not full after 0.082 seconds, there will be no pulse "high" to the AND gates. Thus AND gates 308 and 310 are inhibited from producing pulses which will activate up/down counter 312.

The pulsed output from latches 266 and 266A are provided to an RC network comprised of a resister of 322 and a capacitor 324. It is this circuit which functions as the RC filter circuit described hereinbefore. It will be appreciated that the phase difference between the in-phase and quadrature signals can vary from for instance +20° to −20°. Thus, as an example, if 1.25 volts represents a 90° phase difference, then 1.55 volts, being 3/10 of a volt above 2.5 v can represent a +20° phase error, whereas a voltage of 0.45 volts can represent a −20° phase error, i.e., 3/10 of a volt below 1.25 v. Comparators can be set to respond to thresholds above, for instance, 1.55 volts and would thus ignore the −20° condition. In order to remedy this, an absolute value circuit 230 is provided which converts the below 1.25 volt signal to the appropriate above 1.25 volt signal.

The output of the absolute value circuit is applied to a comparator 232 which has a reference voltage at, for instance, 1.55 volts. The output of comparator 232 is coupled to one of the inputs of AND gate 310 which provides a down pulse to up/down counter 312, whereas this output is also applied through an inverter 236 to one of the inputs of AND gate 308 which provides an up count pulse to up/down counter 312.

In operation, upon achieving 256 counts within 0.82 seconds, the AND gates are enabled. A pulse from an AND gate occurs when there is an inverted or uninverted output from comparator 232. When the output from comparator 232 is low an up count is generated, whereas when the output from comparator 232 is high, a down count is generated.

The output of counter 312 is applied to an R/2R ladder 250 which converts the count to an analog voltage. This voltage is applied to an amplifier 252 which drives a current amplifier 254. The output of this circuit controls the scale illumination current over line 256 to light source 258 such that sensing of a dirty scale increases scale illumination until the Signal A, Signal B phase difference drops within 20° of 90°. Thus the light source illumination is maintained at exactly that necessary to provide good readings. In so doing the control voltage history documents encoder efficiency and mean time to failure.

Figure 9A:
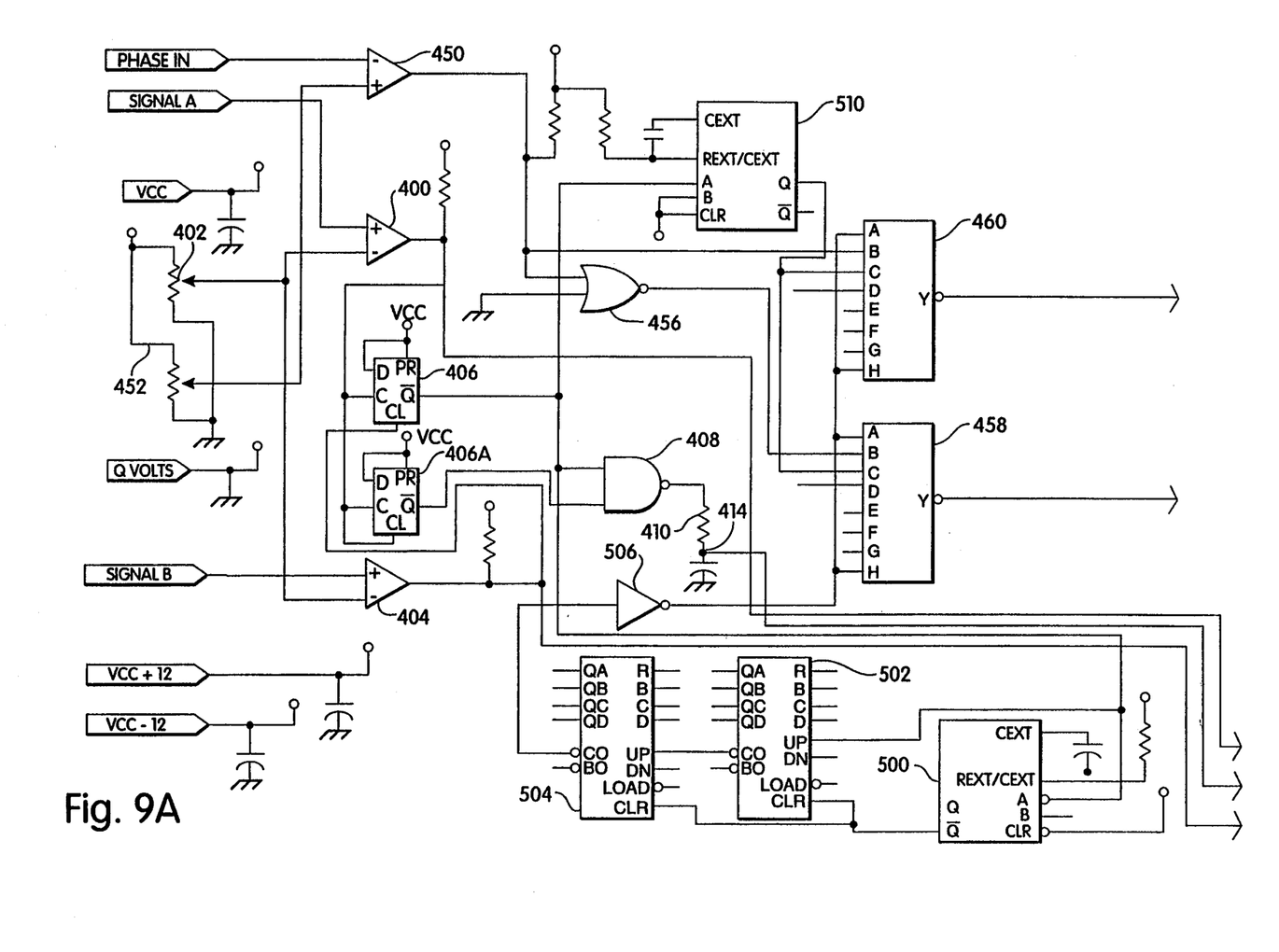
Figure 9B:
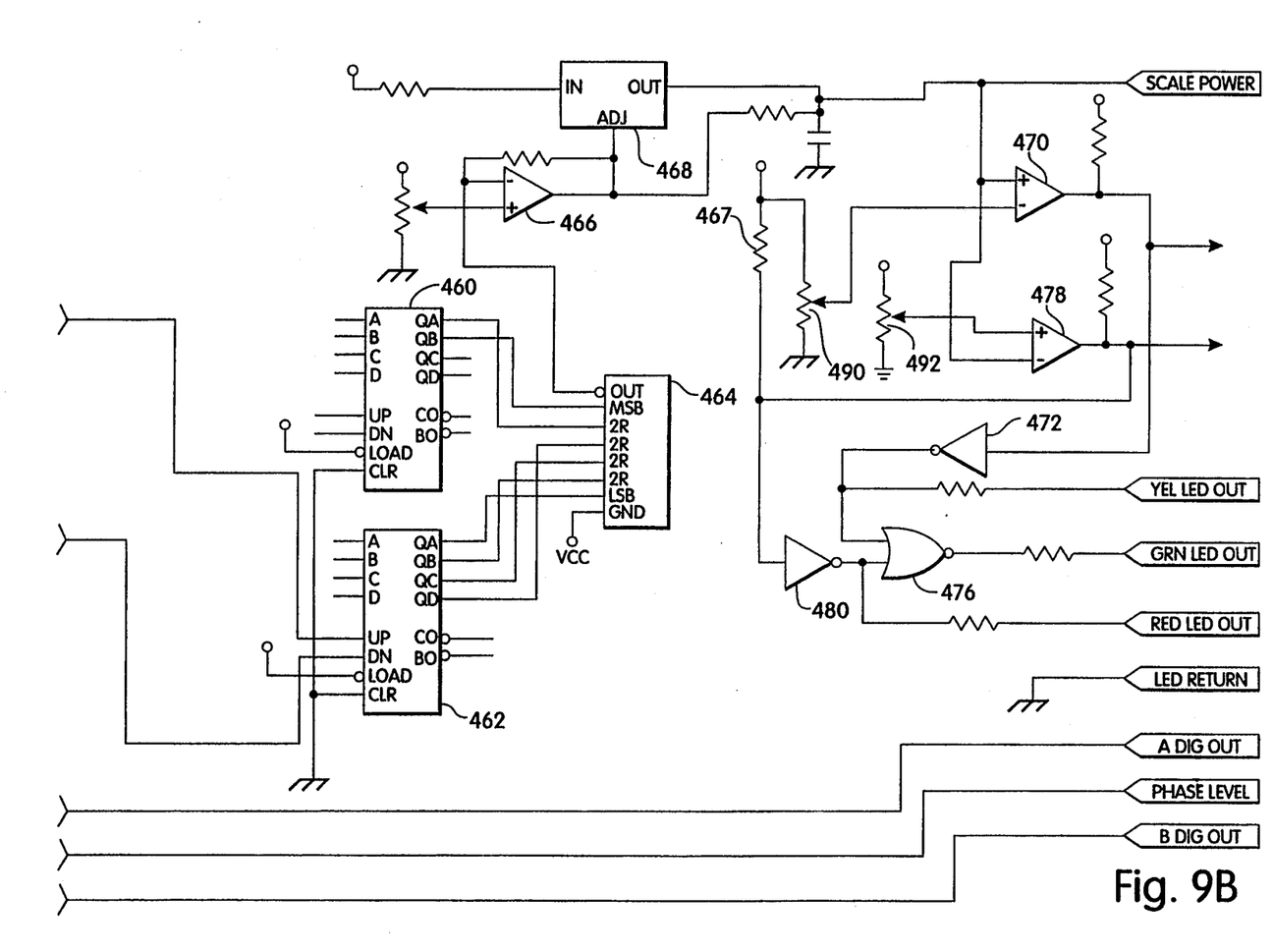
Figure 9C:
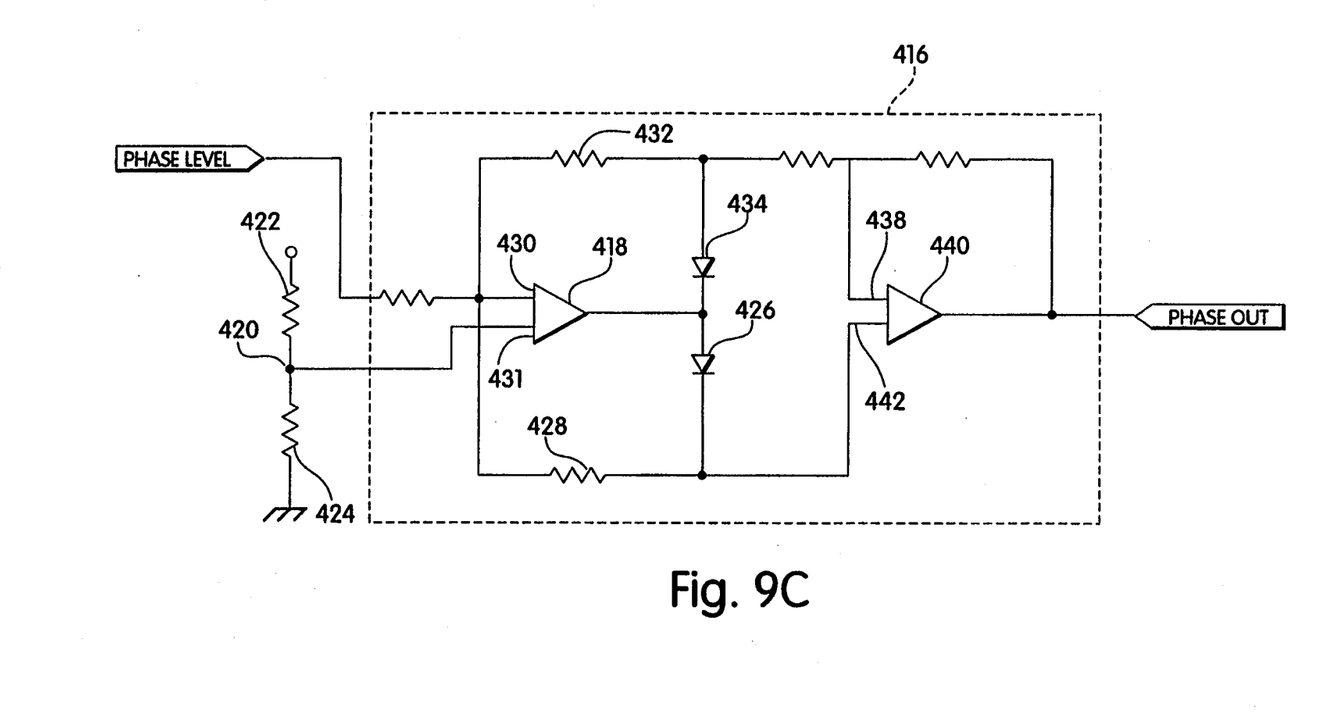

Referring now to FIG. 9, the schematic diagram represents one implementation of the digital encoder scale monitoring system. As can be seen, the signal A input, is coupled to a comparator 400 utilized to square up the pulsed wave form, with the reference voltage for this comparator being set by potentiometer 402. Likewise for the signal B input, comparator 404 is utilized to square up this signal. The outputs of comparators 400 and 404 are applied to D type latches 406 and 406A the output of which is applied to a NAND Gate 408 having as its output a signal applied across an RC circuit here illustrated at 410 and 412. The center tap 414 of the RC circuit provides an analog voltage corresponding to phase difference. This voltage is applied at an inverting input terminal 430 to an absolute value circuit 416 which includes a differential amplifier 418 with its non-inverting input terminal 431 coupled to the center 420 of a voltage-dividing circuit 422 and 424. The output of amplifier 418 is fed back via diodes 426 and resistor 428 to input terminal 430, with this input terminal coupled via resistor 432 and diode 434 to the output of amplifier 418. The output stage of this circuit is coupled through resistor 436 to terminal 438 of differential amplifier 440, whereas the other side is applied to non-inverted input terminal 442. A feedback from the output of amplifier 440 is coupled through resistor 444 back to the inverting input terminal 438 of this amplifier.

The output of amplifier 440 is therefore an analog voltage in which the phase deviation from 90° is always expressed as a positive-going voltage.

This voltage is applied to a comparator 450 having its reference voltage set via potentiometer 452. The output of this comparator is applied to one of the input terminals of NOR gate 456, the output of which is coupled to counter 458, with the output of comparator 450 also being applied to counter 460.

With a voltage high at the output of comparator 450, this indicates an out-of-quadrature condition, which after 256 pulses is used to increment up/down counter 462. On the other hand, if the output of comparator 450 is low after 256 pulses, indicating proper encoder functioning, the up/down counter 462 is decremented.

The outputs of counters 458 and 460 are applied to up/down counter 462 for this purpose, with the output of counter 462 being coupled to an R2R ladder 464. The output of R2R ladder 464 is applied to a differential amplifier 466, having its output level set via a potentiometer 467 to initialize the circuit to a particular encoder configuration. The output of amplifier 466 is utilized to control a voltage or current regulator 468 to increase the voltage to the light source of the scale via increasing the voltage at output J1-9.

This output voltage is also applied to a comparator 470 which provides a negative going output pulse when the light source voltage goes above a voltage level indicative of a slight out-of-tolerance condition corresponding to a slight increase in light source drive voltage. The output of this comparator inverted through an inverter 472 and resistor 474 is provided to activate a yellow LED readout indicator indicating an initial problem. The output of inverter 472 is also applied to a NOR gate 476, the other input to which is driven by the inverted output of a comparator 478, set for instance at 5.5 volts, the maximum voltage to the light source to indicate imminent failure. Note, the output of comparator 478 is inverted by inverter 480. As will be appreciated, when the input voltage to comparator 478 reaches 5.5 volts, its output signal goes negative, with the inverted output of inverter 480 utilized to drive a red LED readout indicator. When neither of these two inverted signals are present, a green LED indicator is illuminated via the output of NOR gate 476. The input reference voltages to comparators 470 and 478 are set to different levels indicating different degrees of seriousness of the encoder deficiency, namely, the degree of out-of-quadrature that exists for the in-phase and quadrature signals from the encoder.

The voltage by which the light source is driven is detected by comparators 470 and 478 whose outputs are also used to stop up counting when the light source voltage reaches $V_{MAX}$ and to stop down counting when the light source voltage exceeds $V_{MIN}$. $V_{MAX}$ is set by potentiometer 492 and $V_{MIN}$ is set by potentiometer 490. In operation, when the output of the $V_{MAX}$ comparator 478 is low, this is equivalent to the level at which the red LED is turned on; and the signal low is applied to the Phase 1 line to AND gate 460 which inhibits up counting. Likewise, when the light source voltage is below $V_{MIN}$, the comparator 470 output is low and down counting is stopped, with the yellow LED being activated at this time. Thus only if the light source voltage is within certain ranges will the up/down counter be provided with up/down signals.

With respect to the inhibiting of counters 458 and 464 slowly moving scales, counters 458 and 460 are reset if a one-shot multi vibrator 500 times out which indicates a scale which is moving too slowly to be reliable. In order to accomplish this, the output of latch 406 is applied to a one-shot multivibrator 500 and also to the up count terminal of counter 502, the output of which is coupled to the up count terminal of up counter 504. The output of counter 504 is coupled through an inverter 506 to one input terminal of AND gates 458 and 460. The Q output of one-shot multivibrator 500 is applied to the clear terminals of counters 502 and 504 as illustrated.

In operation, upon the receipt of an output from D latch 406, one-shot multivibrator 500 is set and starts timing. This removes the Q signal from its output which enables counters 502 and 504 to count up with each pulse from the latch. In one embodiment, when the number 256 is reached, the output of inverter 506 goes low to remove the blocking signal from AND gates 458 and 460. When the pulses out of latch 406 are too slow, the output of inverter 506 goes high to block and/or gates 458 and 460, with the output of inverter 506 going high because counters 502 and 504 are cleared. In essence, counters 502 and 504 form a divide-by-256 circuit, with the counters being cleared if 256 pulses are not received in the time period set by multivibrator 500.

Thus, should multivibrator 500 time out before a time period indicating a slow scale, counters 502 and 504 are cleared which disables 458 and 460.

In order to make the counting system more reliable the output of latch 406 is coupled to a one-shot multivibrator 510 which provides a very short output pulse to and/or gates 458 and 460 for enabling these gates when the D latch output goes high. This short enabling pulse provides for noise reduction in the up/down counting sequence so that a very narrow pulse is allowed through AND gates 458 or 460.

It will be appreciated that the voltage reference levels, the comparator functions, and virtually all analog functions of the circuits described above can be simulated with digital processing assuming an analog-to-digital converter. Thus the subject scale monitoring system can be adapted to both analog and digital encoders with merely a change in the program of a microprocessor, so similar are the functions. Indeed, digital processing within a microprocessor can be arranged to either measure phase difference or amplitude changes in the output of an encoder such that the scale monitoring system can be digitally implemented.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for monitoring the operation of an encoder having a scale which is illuminated from a light source and in which light from the scale is detected by a detector, said encoder having means coupled to said detector for generating in-phase and quadrature signals representative of scale position, comprising:

means coupled to said in-phase and quadrature signals for detecting the phase difference therebetween;

means responsive to said detected phase difference for adjusting the output of said light source so as to maintain the output therefrom at a predetermined level and for providing an error signal representing the amount of adjustment of the output of said light source; and, means for providing an alarm indication responsive to a predetermined characteristic of said error signal.

2. The apparatus of claim 1 wherein said predetermined characteristic includes said error signal exceeding a predetermined threshold.

3. The apparatus of claim 1 wherein said predetermined characteristic includes the time varying rate of change of said error signal exceeding a predetermined threshold.

4. The apparatus of claim 1 and further including means coupled to said error signal for generating a histogram of said error signal to permit determination of the functioning of said encoder over time.

* * * * *